US00RE36255E

United States Patent [19]

Nguyen

[11] E Patent Number: Re. 36,255

[45] Reissued Date of Patent: Jul. 20, 1999

[54] METHOD OF PLAYING A GAME OF SKILL AND CHANCE

[76] Inventor: Son H. Nguyen, 11052 Stonecress, Fountain Valley, Calif. 92708

[21] Appl. No.: 08/733,520

[22] Filed: Oct. 18, 1996

Related U.S. Patent Documents

Reissue of:

[64] Patent No.: 5,503,401
Issued: Apr. 2, 1996
Appl. No.: 08/376,406
Filed: Jan. 23, 1995

[51] Int. Cl.[6] ..... A63F 1/00

[52] U.S. Cl. ..... 273/306; 273/292

[58] Field of Search ..... 273/292, 274, 273/309, 306; 463/12, 13

[56] References Cited

U.S. PATENT DOCUMENTS

| | | | |
|---|---|---|---|
| 4,995,615 | 2/1991 | Cheng | 273/292 |
| 5,013,049 | 5/1991 | Tomaszewski | 273/292 |
| 5,072,946 | 12/1991 | Miller | 273/292 |
| 5,265,882 | 11/1993 | Malek | 273/292 |
| 5,275,415 | 1/1994 | Wisted | 273/274 |
| 5,275,416 | 1/1994 | Schorr et al. | 273/292 |
| 5,280,915 | 1/1994 | Groussman | 273/292 |
| 5,320,356 | 6/1994 | Cauda | 273/292 |
| 5,350,356 | 9/1994 | DiLullo et al. | 273/146 |
| 5,356,140 | 10/1994 | Dabrowski et al. | 463/13 |
| 5,377,973 | 1/1995 | Jones et al. | 463/13 |
| 5,397,128 | 3/1995 | Hesse et al. | 273/274 |
| 5,411,268 | 5/1995 | Nelson et al. | 273/292 |
| 5,476,265 | 12/1995 | Miller et al. | 273/292 |

OTHER PUBLICATIONS

U.S. Copyright Registration No. TXu 601–910, to Son Huynh Nguyen (Oct. 15, 1993).

Win Magazine, Apr. 1992, pp. 39, 40 and 70.

*Primary Examiner*—Benjamin H. Layno

*Attorney, Agent, or Firm*—Kenton R. Mullins

[57] ABSTRACT

The method of playing a card game of the present invention is operated among a plurality of players arranged about a table. The method uses a card deck of 480 cards which consists of 12 modified conventional decks. Each modified conventional deck has an additional four joker cards and has all 7, 8, 9, and 10 cards removed therefrom. According to the method of the present invention, each of the plurality of players places a wager. A first player is assigned the title of banker and is provided three dice. The banker rolls the three dice to determine the assignment of an action button to a second player. The assignment of the action button to the second player is determined from the number indicated by the rolled dice. The first round of two cards is dealt one face up and one face down to the banker, and two face down to the other players in rotation. After all players have received their two cards, the players inspect their hands (consisting of the two hands) and determine whether additional cards are desired. Such additional cards, up to a total of two, are dealt beginning with a player seated to the immediate left of the banker. The hands of the various players are then compared with the hands of the banker and winners are declared who have hands that meet a predetermined scheme better than the banker's hand.

24 Claims, 1 Drawing Sheet

Fig. 1
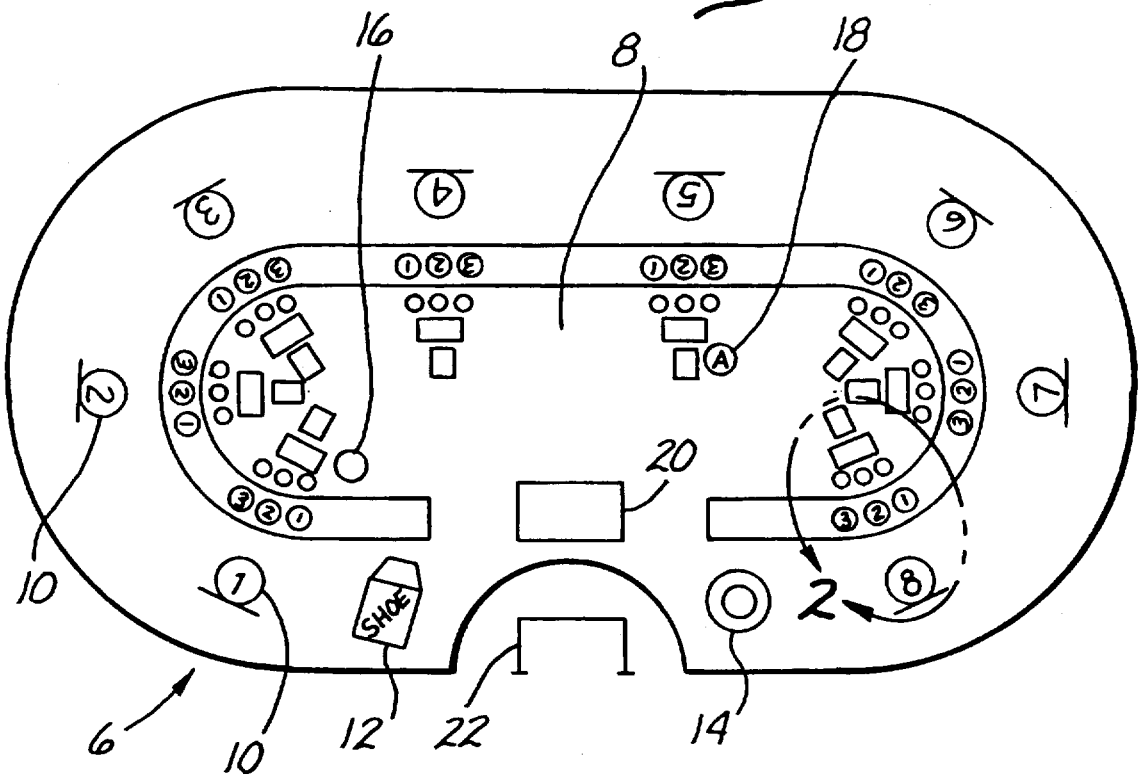
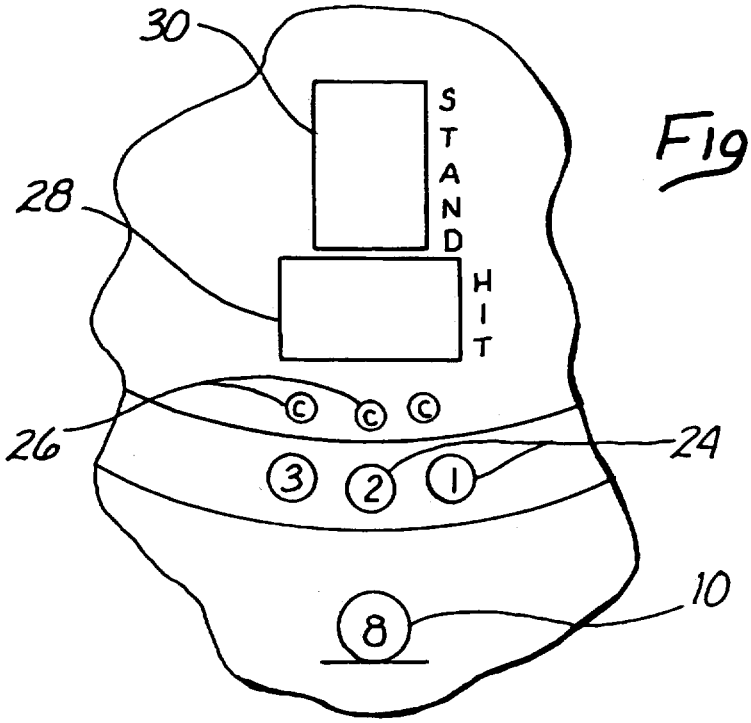
Fig. 2

METHOD OF PLAYING A GAME OF SKILL AND CHANCE

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention generally relates to card games and, in particular, to card games utilizing customized decks of cards for use in casinos.

2. Description of Related Art

Card games have existed where players are dealt a number of cards and then have an option of receiving additional cards. The object of such a game is to score a predetermined number of points without going over this predetermined number. A well-known game where the object is to reach a value of twenty-one without going over this limit is Black Jack.

Applicant is aware of several card games which generally can be played in a casino-type environment. U.S. Pat. No. 5,072,946 to Miller discloses a casino-type card game involving two players. A card is dealt to each player, and when the numerical values of the cards are compared, a tie ends the game, or another card is dealt to the player with the lower numerical value hand. The player first reaching a predetermined numerical value eventually wins the game. Another patent, U.S. Pat. No. 5,265,882 to Malek discloses a casino-type card game wherein a player simultaneously plays at least two of three games against the player. This game is applicable to Twenty-One, modified Draw Poker, and Baccarat. U.S. Pat. No. 5,275,415 to Wisted discloses a Blackjack-type game among a plurality of players playing against each other with a player. The dealer, however, does not receive any cards. A final card game to Schorr et al., U.S. Pat. No. 5,275,416, discloses a Blackjack-type card game with at least one customer wagering a first bet on any one of a dealer betting station corresponding to the "dealer hand," a player betting station corresponding to the "player hand," and a tie betting station. None of these games, however, use modified card decks in combination with customized playing rules, as does the present invention.

SUMMARY OF THE INVENTION

The method of playing a card game of the present invention is operated among a plurality of players arranged about a table. The method uses a card deck of 480 cards which consists of 12 modified conventional decks. Each modified conventional deck has an additional four joker cards and has all 7, 8, 9, and 10 cards removed therefrom. According to the method of the present invention, each of the plurality of players places a wager. A first player is assigned the title of banker and is provided three dice. The banker rolls the three dice to determine the assignment of an action button to a second player. The assignment of the action button to the second player is determined from the number indicated by the rolled dice. The first round of two cards is dealt one face up and one face down to the banker, and two face down to the other players in rotation. After all players have received their two cards, the players inspect their hands (consisting of the two hands) and determine whether additional cards are desired. Such additional cards, up to a total of two, are dealt beginning with a player seated to the immediate left of the banker. The hands of the various players are then compared with the hands of the banker and winners are declared who have hands that meet a predetermined scheme better than the banker's hand.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

FIG. 1 shows a preferred layout of the card table of the present invention which is used in connection with the method of the present invention; and FIG. 2 is a close-up view of the playing area in front of a player position according to the presently preferred embodiment.

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein.

FIG. 1 shows the table 6 of the presently preferred embodiment, which comprises a playing surface 8 located in a central portion thereof. Eight player positions 10 are positioned about the periphery of the table 6, and a house dealer's position 22 is positioned between two of the player positions 10. The house dealer's tray 20 is positioned in front of the house dealer's position 22. The house dealer's tray 20 can store chips used during play of the game of the presently preferred embodiment. A bank button 16 is positioned in front of one of the player positions 10 to indicate which player is currently serving as banker. Similarly, an action button 18 is positioned in front of one of the player positions 10 to indicate which player will first receive two cards and first compare his hand with the hand of the house dealer 22. A cup, dice, and saucer 14 are provided to the right of the house dealer's position 22 on the playing surface 8.

FIG. 2 shows a close-up view of the playing area in front of each player position 10. Wager circles 24 accommodate wagers, and collection circles 26 accommodate corresponding collections, as described in copending application "Method of Playing California Paigow," U.S. Ser. No. 08/376,402, by the same inventor. The hit box accommodates cards when the corresponding player wishes to draw more cards, and the stand box accommodates the player's cards when the player does not wish to draw additional cards.

The card shoe 12 accommodates a unique deck of 480 cards. Although the method of the presently preferred embodiment may be similar to the commonly-played game of Blackjack in that the goal of the game is to reach a predetermined number of points, the specific deck of cards and other various rules provide significant distinguishing features over this prior art. For example, the deck of 480 cards consists of 12 modified conventional card decks. Each conventional deck is modified by adding 4 joker cards and removing all 7, 8, 9, and 10 cards.

According to the method of the presently preferred embodiment, each player places a wager in one or more of the wager circles 24 and a required fee and one or more of the collection circles 26, as described in copending application "Method of Playing California Paigow," U.S. Ser. No. 08/376,402, by the same inventor. The player to the immediate left of the house dealer's position is first assigned the bank button 16 to indicate that the first player is presently serving as banker. This first player serves as banker for two games, and then the bank button 16 is given to a player to the left of the first player for two games. The house dealer then gives the cup and dice to the player with the bank button 16 and that player rolls the dice to determine assignment of the action button 18. If the sum of the three rolled dice is five, for example, a player five positions to the left of the house dealer's position 22 receives the action button 18.

The house dealer begins dealing cards to the players in a clockwise manner starting with the player having the action button 18. Each of the first cards dealt to each of the players is dealt face down, except the player having the bank button 16 receives a card face up. A total of two cards are dealt to each of the players, which totals two clockwise passes by the dealer. After these two passes, each player has two cards face down, and the bank has one card face down and one card face up.

The various players take their hands (each hand comprising two cards) and inspect them, determining whether additional cards are desirable. Beginning with the player to the left of the banker, players are given the opportunity to have additional cards dealt from the house dealer. If a player does not want additional cards, he places his cards in the stand box 30. On the other hand, if a player wishes to have additional cards dealt to him, then he places his cards in the hit box 28.

The house dealer opens the banker's cards, placing them face up for all of the players to view, and the banker determines whether additional cards are desired for his hand.

According to the method of the presently preferred embodiment, the cards in the customized deck of 480 cards are assigned values according to the following scheme: all aces are counted as 1, and numbered cards from 2 to 6 are counted as their indicated values. Suits are ignored. Jacks, queens, and kings are counted as zero, and joker cards can be counted as either 1 or 11, if there is only one joker card in a hand. Otherwise, joker cards are counted as 1 (when two or more joker exist in a single hand). As previously mentioned, the best possible hand will have a total value of cards equalling 11 points. An instant winner gets a total of 11 points from his or her first two cards when these two cards comprise a face card and a joker card.

Since the player having the action button 18 is allowed to compare his cards with those of the player having the bank button 16 first, the player having the action button 18 has the highest probability of winning or losing money. The amount of money represented by chips in the wager circles 24 in front of the player having the bank button 16 represents the total amount of money available to be won during any given game. Thus, if the player having the action button 18 wins all of the money in the banker's wager circles 24, then there is no money left for the other players to win. Accordingly, the other players are entitled to a refund of the money in their collection circles 26. Details of this protocol are described in copending application "Method of Playing California Paigow," U.S. Ser. No. 08/376,402, by the same inventor.

The ranking chart below shows the prioritization of hands from a best hand (an instant winner) to a worst hand (having a value of 14 or over).

| | | |
|---|---|---|
| (1) | joker + any face card | instant Winner |
| (2) | A total of 11 | (i.e. 6 + 5) |
| (3) | A total of 10 | (i.e. 5 + 5) |
| (4) | A total of 9 | (i.e. 6 + 3) |
| (5) | A total of 8 | (i.e. 4 + 2 + 2) |
| (6) | A total of 7 | (i.e. 3 + face + 4) |
| (7) | A total of 6 | (i.e. 2 + 2 + face + 2) |
| (8) | A total of 5 | (i.e. 1 + face + 4 + face) |
| (9) | A total or 4 | (i.e. 2 + face + face + 2) |
| (10) | A total of 3 | (i.e. face + 1 + 2 + face) |
| (11) | A total of 2 | (i.e. 1 + 1 + face + face) |
| (12) | A total of 1 | (i.e. face + 1 + 1 face + face) |
| (13) | A total of 0 | (i.e. face + face + face + face) |
| (14) | A total of 12 | (i.e. 4 + face + 2 + 6) |
| (15) | A total of 13 | (i.e. 2 + 3 + 2 + 6) |
| (16) | A total of 14 or over | (i.e. 4 + face + 4 + 6) |

Any natural winner hand between the dealer and a player is considered a "push" hand. The player basically does not use his wager, but loses the collection, as described in copending application "Method of Playing California Paigow." In the presently preferred embodiment, players must stand on nine or better.

Another feature of the presently preferred embodiment is that all of the players are allowed to have additional cards dealt to them to a maximum number of two cards before the banker is provided a similar opportunity. Another feature of the presently preferred embodiment requires the dealer to hit on seven or less and to stand on nine or better. The dealer option hand is a value of eight.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A method of playing a card game among a plurality of players arranged in a circular fashion, a dealer being positioned between two of the players, the method comprising the following steps:

providing a [deck of 480 cards by modifying and combining conventional decks, each modified conventional deck being modified by adding 4 joker cards and] *set of cards by modifying at least one group of cards generally corresponding to a conventional deck of cards, the modified group of cards being modified by* removing all 7, 8, 9, and 10 cards;

placing a wager by each of said players;

a first player among the plurality of players being assigned the title of banker;

providing at least one [die] *decision piece* to the banker, the banker [rolling] *using* the at least one [die] *decision piece* to determine an assignment of an action button;

assigning to a second player among the plurality of players the action button, the assignment of the action button to the second player being based upon a number generated by the [rolling] *using* of the [dice] *decision piece*;

dealing by the dealer a first round of [two] cards to each of the plurality of players in rotation[, one face up and one face down to the banker and two face down to each of the plurality of players, and none to the dealer];

determining by each of the players whether [zero, one, or two more cards is] *zero or at least one additional card is* desired;

dealing by the dealer a second round of cards to any player in rotation [that] *who* wants a card or cards[, the dealing of the second round of cards beginning with a player seated to the immediate left of the first player]; *and* comparing the hands of the banker to each of the players' hands and declaring as winners players having hands that meet a required scheme better than the banker's hand meets the required scheme, wherein the required scheme assigns a "best hand" to be a combination of cards which adds up to a first predetermined number greater than zero, and assigns a "worst hand" to be a combination of cards which adds up to a second predetermined number which is greater than the first predetermined number, wherein a hand having a combination of cards which adds up to any number greater than or equal to zero, and less than or equal to the first predetermined number, cannot result in a bust, wherein a hand having a combination of cards which adds up to any number greater than the first predetermined number and less than or equal to the second predetermined number also cannot result in a bust, wherein when comparing a hand having a combination of cards adding up to said any number greater than or equal to zero, and less than or equal to the first predetermined *number*, with a hand having a combination of cards adding up to said any number greater than the first predetermined number and less than or equal to the second predetermined number, declaring said hand having a combination of cards adding up to said any number greater than or equal to zero, and less than or equal to the first predetermined number as the winning hand, and wherein when comparing two hands, each of said two hands having a combination of cards adding up to said any number greater than the first predetermined number and less than or equal to the second predetermined number, declaring said hand having a combination of cards adding up to a number closer to said first predetermined number as the winning hand.

2. The method of playing a card game according to claim 1, wherein the at least one [die] *decision piece* provided to the banker comprises three dice.

3. The method of playing a card game according to claim 2, wherein the step of the banker rolling the dice to determine an assignment of an action button comprises the following substeps:

the banker placing the dice into a cup;

the banker shaking the cup;

the banker rolling the dice from the cup;

adding numbers displayed on tops of the three dice; and counting from the banker a number of players to the left of the banker, the second player being the counted number of players to the left of the banker, the counted number being equal to the number displayed on the three dice.

4. The method of playing a card game according to claim 3, the dealer collecting a percent of each player's wager.

5. The method of playing a card game according to claim 1, further comprising an initial step of:

providing a table having a playing surface and a circular periphery, the plurality of players being arranged about the periphery.

6. The method of playing a card game according to claim 5, the playing surface of the table comprising:

card receiving areas;

wagering areas; and collection areas.

7. A method of playing a card game among a [dealer and a] plurality of players, comprising the following steps[;]:

providing a [deck of 480 cards by modifying and combining 12 conventional decks, each modified conventional deck being modified by adding 4 joker cards and removing all 7, 8, 9, and 10 cards] *set of cards corresponding at least in part to a full deck of cards, each of a plurality of the cards having a characteristic which can be associated with a numerical value;*

[the dealer assigning to a first player among the plurality of players the title of banker;]

placing a required wager by each of said players;

*a first player among the plurality of players being assigned the title of banker;* providing at least one [die] *decision piece* to the banker, the banker [rolling] *using* the at least one [die] *decision piece* to determine an assignment of an action button;

assigning to a second player among the plurality of players the action button, the assignment of the action button to the second player being based upon a number generated by the [rolling] *using* of the [dice] *decision piece;*

[the dealer] dealing *by a dealer* a first [card to the second player, and dealing first cards to the rest] *round of cards to the banker and to each* of the plurality of players *in rotation;*

*determining by each of the players whether zero or at least one additional card is desired;*

[the dealer] dealing *by the dealer* a second [card to the second player, and dealing second cards to the rest of the plurality of players;] *round of cards to any player in rotation who wants a card or cards; and*

[each player assembling cards dealt from the dealer and determining whether an additional card from the dealer is desired, the dealer dealing additional cards to players who have determined that additional cards are desired; and the dealer and the plurality of players comparing all of the dealt cards and dividing the wagers according to a predetermined scheme,]

*comparing the hands of the banker to each of the players' hands and declaring as winners players having hands that meet a required scheme better than the banker's hand meets the required scheme,* wherein the [predetermined] *required* scheme assigns a "best hand" to be a [joker plus any face card] *combination of cards which adds up to a first predetermined number greater than zero,* and assigns a "worst hand" to be a [hand totalling 14 or more, the predetermined scheme being set forth fully from best down to worst, in descending order, below:

| | | |
|---|---|---|
| (1) | Joker + any face card | Instant Winner |
| (2) | A total of 11 | (i.e. 6 + 5) |
| (3) | A total of 10 | (i.e. 5 + 5) |
| (4) | A total of 9 | (i.e. 6 + 3) |
| (5) | A total of 8 | (i.e. 4 + 2 + 2) |
| (6) | A total of 7 | (i.e. 3 + face + 2) |
| (7) | A total of 6 | (i.e. 2 + 2 + face + 2) |
| (8) | A total of 5 | (i.e. 1 + face + 4 + face) |

-continued

| | | |
|---|---|---|
| (9) | A total or 4 | (i.e. 2 + face + face + 2) |
| (10) | A total of 3 | (i.e. face + 1 + 2 + face) |
| (11) | A total of 2 | (i.e. 1 + 1 + face + face) |
| (12) | A total of 1 | (i.e. face + 1 + 1 face + face) |
| (13) | A total of 0 | (i.e. face + face + face + face) |
| (14) | A total of 12 | (i.e. 4 + face + 2 + 6) |
| (15) | A total of 13 | (i.e. 2 + 3 + 2 + 6) |
| (16) | A total of 14 or over | (i.e. 4 + face + 4 + 6)] |

*combination of cards which adds up to a second predetermined number which is greater than the first predetermined number,*

*wherein a hand having a combination of cards which adds up to any number greater than or equal to zero, and less than or equal to the first predetermined number, cannot result in a bust,*

*wherein a hand having a combination of cards which adds up to any number greater than the first predetermined number and less than or equal to the second predetermined number also cannot result in a bust,*

*wherein when comparing a hand having a combination of cards adding up to said any number greater than or equal to zero, and less than or equal to the first predetermined number, with a hand having a combination of cards adding up to said any number greater than the first predetermined number and less than or equal to the second predetermined number, declaring said hand having a combination of cards adding up to said any number greater than or equal to zero, and less than or equal to the first predetermined number as the winning hand, and*

*wherein when comparing two hands, each of said two hands having a combination of cards adding up to said any number greater than the first predetermined number and less than or equal to the second predetermined number, declaring said hand having a combination of cards adding up to a number closer to said first predetermined number as the winning hand.*

8. The method of playing a [card] game *of skill and chance* according to claim 7, wherein the at least one [die] *decision piece* provided to the banker comprises three dice.

9. The method of playing a card game according to claim 8, wherein the step of the banker rolling the dice to determine an assignment of an action button comprises the following substeps:

the banker placing the dice into a cup;

the banker shaking the cup;

the banker rolling the dice from the cup;

adding numbers displayed on tops of the three dice; and counting from the banker a number of players to the left of the banker, the second player being the counted number of players to the left of the banker, the counted number being equal to the number displayed on the three dice.

10. The method of playing a card game according to claim 7, the dealer dealing a first card face up to the banker, and dealing first cards face down to the rest of the plurality of players *in* a clockwise fashion.

11. The method of playing a [card] game *of skill of chance* according to claim 10, the dealer dealing a second card face down to the banker, and dealing second cards face down to the rest of the plurality of players in a clockwise fashion.

12. The method of playing a card game according to claim 10, the dealer collecting a percent of each player's wager.

13. The method of playing a card game according to claim 7, wherein each player assembling cards dealt from the dealer to the player determines whether [one or two] *zero or at least one* additional card from the dealer is desired.

14. A method of playing a card game among a plurality of players [arranged about a table], the method comprising the following steps[;]:

providing a [deck of 480 cards] *set of cards* by modifying [and combining 12 conventional decks, each modified conventional deck being modified by adding 4 joker cards and] *at least one group of cards generally corresponding at least in part to a conventional deck of cards, the modified group of cards being modified by* removing all 7, 8, 9, and 10 cards;

placing a wager by each of said players;

a first player among the plurality of players being assigned the title of banker;

providing at least one [die] *decision piece* to the banker, the banker [rolling] *using* the at least one [die] *decision piece* to determine an assignment of an action button:

assigning to a second player among the plurality of players the action button, the assignment of the action button to the second player being based upon a number generated by the [rolling] *using* of the [dice] *decision piece*;

dealing *by a dealer* a first round of [two] cards[, one face up and one face down to the banker and two face down to the other of the plurality of players in rotation beginning with the second player] *to the banker and to each of the plurality of players in rotation*;

*determining by each of the players whether zero or at least one additional card is desired;* dealing *by the dealer* a second round of cards to any player in rotation [that] *who* wants [up to two additional cards, the dealing of the second round of cards beginning with a player seated to the immediate left of the first player] *a card or cards*; and comparing the hands of the banker to each of the players' *hands* and declaring as winners players having hands that meet a [predetermined] *required* scheme better than the banker's hand *meets the required scheme*, wherein the [predetermined] *required* scheme assigns a "[bet] *good* hand" to be a [joker plus any face card and assigns a "worst hand" to be a hand totalling 14 or more, the predetermined scheme being set forth fully from best down to worst in descending order, below:

| | | |
|---|---|---|
| (1) | Joker + any face card | Instant Winner |
| (2) | A total of 11 | (i.e. 6 + 5) |
| (3) | A total of 10 | (i.e. 5 + 5) |
| (4) | A total of 9 | (i.e. 6 + 3) |
| (5) | A total of 8 | (i.e. 4 + 2 + 2) |
| (6) | A total of 7 | (i.e. 3 + face + 2) |
| (7) | A total of 6 | (i.e. 2 + 2 + face + 2) |
| (8) | A total of 5 | (i.e. 1 + face + 4 + face) |
| (9) | A total or 4 | (i.e. 2 + face + face + 2) |
| (10) | A total of 3 | (i.e. face + 1 + 2 + face) |
| (11) | A total of 2 | (i.e. 1 + 1 + face + face) |
| (12) | A total of 1 | (i.e. face + 1 + 1 face + face) |
| (13) | A total of 0 | (i.e. face + face + face + face) |
| (14) | A total of 12 | (i.e. 4 + face + 2 + 6) |
| (15) | A total of 13 | (i.e. 2 + 3 + 2 + 6) |
| (16) | A total of 14 or over | (i.e. 4 + face + 4 + 6)] |

*combination of cards which adds up to a first predetermined number greater than zero, and assigns a "poor hand" to be a combination of cards which adds up to a second predetermined number which is greater than the first predetermined number,*

*wherein a hand having a combination of cards which adds up to any number greater than or equal to zero, and less than or equal to the first predetermined number, cannot result in a bust,*

*wherein a hand having a combination of cards which adds up to any number greater than the first predetermined number and less than or equal to the second predetermined number also cannot result in a bust,*

*wherein when comparing a hand having a combination of cards adding up to said any number greater than or equal to zero, and less than or equal to the first predetermined number, with a hand having a combination of cards adding up to said any number greater than the first predetermined number and less than or equal to the second predetermined number, declaring said hand having a combination of cards adding up to said any number greater than or equal to zero, and less than or equal to the first predetermined number as the winning hand, and*

*wherein when comparing two hands, each of said two hands having a combination of cards adding up to said any number greater than the first predetermined number and less than or equal to the second predetermined number, declaring said hand having a combination of cards adding up to a number closer to said first predetermined number as the winning hand.*

15. The method of playing a card game according to claim 14, further comprising an initial step of:

providing a table having a playing surface and a periphery, the plurality of players being arranged about the periphery and the dealer being arranged between two of the plurality of players.

16. The method of playing a card game according to claim 15, the playing surface of the table comprising card receiving areas, wagering areas, and collection areas.

17. The method of playing a card game according to claim 16, wherein the step of the banker [rolling] *using* the [dice] *decision piece* to determine an assignment of an action button comprises the following substeps:

placing [the] *three* dice into a cup and shaking the cup; rolling the dice from the cup;

adding numbers displayed on tops of the three dice; and counting from the banker a number of players to the left of the banker, the second player being the counted number of players to the left of the banker, the counted number being equal to the number displayed on the three dice.

18. The method of playing a card game according to claim 17, the dealer collecting a percent of each player's wager.

19. The method of playing a card game according to claim 14, wherein the at least one [die] *decision piece* provided to the banker comprises three dice.

*20. The method of playing a card game according to claim 1, wherein the first predetermined number is 11, and*

*wherein the second predetermined number comprises a number greater than or equal to 14.*

*21. The method of playing a card game according to claim 1, wherein the first predetermined number comprises a number other than 11, and*

*wherein the second predetermined number comprises a number other than 14.*

*22. The method of playing a card game according to claim 1, wherein the step of dealing by the dealer a first round of cards to the banker and to each of the plurality of players in rotation comprises a step of dealing by the dealer a first round of two cards to the banker and to each of the plurality of players in rotation.*

*23. The method of playing a card game according to claim 7, wherein the step of dealing by the dealer a first round of cards to the banker and to each of the plurality of players in rotation comprises a step of dealing by the dealer a first round of two cards to the banker and to each of the plurality of players in rotation.*

*24. The method of playing a card game according to claim 14, wherein the step of dealing by the dealer a first round of cards to the banker and to each of the plurality of players in rotation comprises a step of dealing by the dealer a first round of two cards to the banker and to each of the plurality of players in rotation.*

* * * * *